(12) United States Patent
Vick, Jr. et al.

(10) Patent No.: US 7,021,386 B2
(45) Date of Patent: Apr. 4, 2006

(54) SAFETY VALVE HAVING EXTENSION SPRING CLOSURE MECHANISM

(75) Inventors: James D. Vick, Jr., Dallas, TX (US); Leo G. Collins, Farmers Branch, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 272 days.

(21) Appl. No.: 10/642,801

(22) Filed: Aug. 18, 2003

(65) Prior Publication Data

US 2005/0039922 A1 Feb. 24, 2005

(51) Int. Cl.
*E21B 34/06* (2006.01)

(52) U.S. Cl. .................. 166/332.8; 137/527
(58) Field of Classification Search ............ 166/332.8, 166/319, 321; 137/527, 515, 537
See application file for complete search history.

(56) References Cited

U.S. PATENT DOCUMENTS

| | | | | |
|---|---|---|---|---|
| 2,064,247 A | * | 12/1936 | Evans | 417/115 |
| 2,711,755 A | * | 6/1955 | Owen | 137/520 |
| 2,780,290 A | * | 2/1957 | Natho | 166/72 |
| 3,356,145 A | * | 12/1967 | Fredd | 166/322 |
| 4,128,106 A | | 12/1978 | Abercrombie | |
| 4,340,088 A | | 7/1982 | Geisow | |
| 4,411,316 A | | 10/1983 | Carmody | |
| 5,137,090 A | * | 8/1992 | Hare et al. | 166/325 |
| 5,145,005 A | | 9/1992 | Dollison | |
| 5,159,981 A | * | 11/1992 | Le | 166/325 |
| 5,310,005 A | | 5/1994 | Dollison | |
| 5,564,675 A | | 10/1996 | Hill, Jr. et al. | |
| 6,196,261 B1 | | 3/2001 | Dennistoun | |
| 6,227,299 B1 | | 5/2001 | Dennistoun | |
| 2003/0000582 A1 | | 1/2003 | Jackson | |
| 2003/0155131 A1 | | 8/2003 | Vick, Jr. | |

FOREIGN PATENT DOCUMENTS

| | | |
|---|---|---|
| GB | 336323 | 10/1930 |
| GB | 772690 | 4/1957 |
| GB | 811237 | 4/1959 |

OTHER PUBLICATIONS

U.K. Search Report for GB0417116.1.
Baker Oil Tools, "Baker 'M' Series Non-Elastomeric Valves" informational publication, undated.

* cited by examiner

*Primary Examiner*—Hoang Dang
(74) *Attorney, Agent, or Firm*—Marlin R. Smith

(57) ABSTRACT

A safety valve having an extension spring closure mechanism. In a described embodiment, a valve for use in a subterranean well is provided which includes a biasing device and a closure member having open and closed positions. The biasing device has a length which decreases as the closure member displaces toward the closed position. The biasing device may be an extension spring.

65 Claims, 10 Drawing Sheets

SAFETY VALVE HAVING EXTENSION SPRING CLOSURE MECHANISM

BACKGROUND

The present invention relates generally to valves utilized in subterranean wells and, in an embodiment described herein, more particularly provides a safety valve having an extension spring closure mechanism.

It is desirable for a valve utilized in a subterranean well to have a relatively thin wall thickness. This permits a larger diameter flow passage to be formed through the valve and/or permits the valve to be installed in a smaller diameter wellbore.

Most conventional safety valves use a torsion spring to bias a closure member toward a closed position relative to the flow passage. An example of a torsion spring biased closure member in a safety valve is found in U.S. Pat. No. 6,196,261, the entire disclosure of which is incorporated herein by this reference.

However, when faced with the task of reducing a safety valve's wall thickness, torsion spring closure mechanisms present several problems. For example, a torsion spring rapidly relaxes, that is, much less biasing force is produced by the torsion spring, as the closure member pivots toward the closed position. In addition, only limited space is available in the reduced wall thickness for positioning the torsion spring relative to the closure member, and a sufficiently strong torsion spring is difficult to fit into this limited space.

One solution to this problem of limited space has been to use one or more compression springs to bias the closure member to the closed position. An example of a compression spring closure mechanism in a safety valve is found in U.S. Pat. No. 6,227,299, the entire disclosure of which is incorporated herein by this reference.

However, the use of compression springs still has the disadvantage of the springs relaxing as the closure member displaces toward the closed position. In addition, the provision of the compression springs in the safety valve requires the length of the safety valve to increase, thereby increasing the cost of the safety valve. Furthermore, the compression spring mechanism requires a number of additional parts be provided in the safety valve.

From the foregoing, it can be seen that it would be quite desirable to provide an improved closure mechanism for valves, including safety valves and other types of valves, utilized in subterranean wells.

SUMMARY

In carrying out the principles of the present invention, in accordance with an embodiment thereof, a valve for use in a subterranean well is provided which includes an extension spring closure mechanism.

In one aspect of the invention, a valve for use in a subterranean well is provided which includes a biasing device and a closure member having open and closed positions. The biasing device has a length which decreases as the closure member displaces toward the closed position.

In another aspect of the invention, a safety valve is provided. The safety valve includes a closure member having open and closed positions and at least one extension spring biasing the closure member toward the closed position.

In a further aspect of the invention, a safety valve is provided which includes a closure member having open and closed positions, a biasing device for biasing the closure member toward the closed position and a beam interconnected between the biasing device and the closure member. The beam is flexed to an increasingly curved configuration, thereby increasingly biasing the closure member toward the closed position, as the closure member displaces toward the open position.

In yet another aspect of the invention, a safety valve is provided which includes a closure member having open and closed positions and a biasing device for biasing the closure member toward the closed position. The biasing device is flexed to an increasingly curved configuration, thereby increasingly biasing the closure member toward the closed position, as the closure member displaces toward the open position.

These and other features, advantages, benefits and objects of the present invention will become apparent to one of ordinary skill in the art upon careful consideration of the detailed description of representative embodiments of the invention hereinbelow and the accompanying drawings.

DETAILED DESCRIPTION

Figure 1:
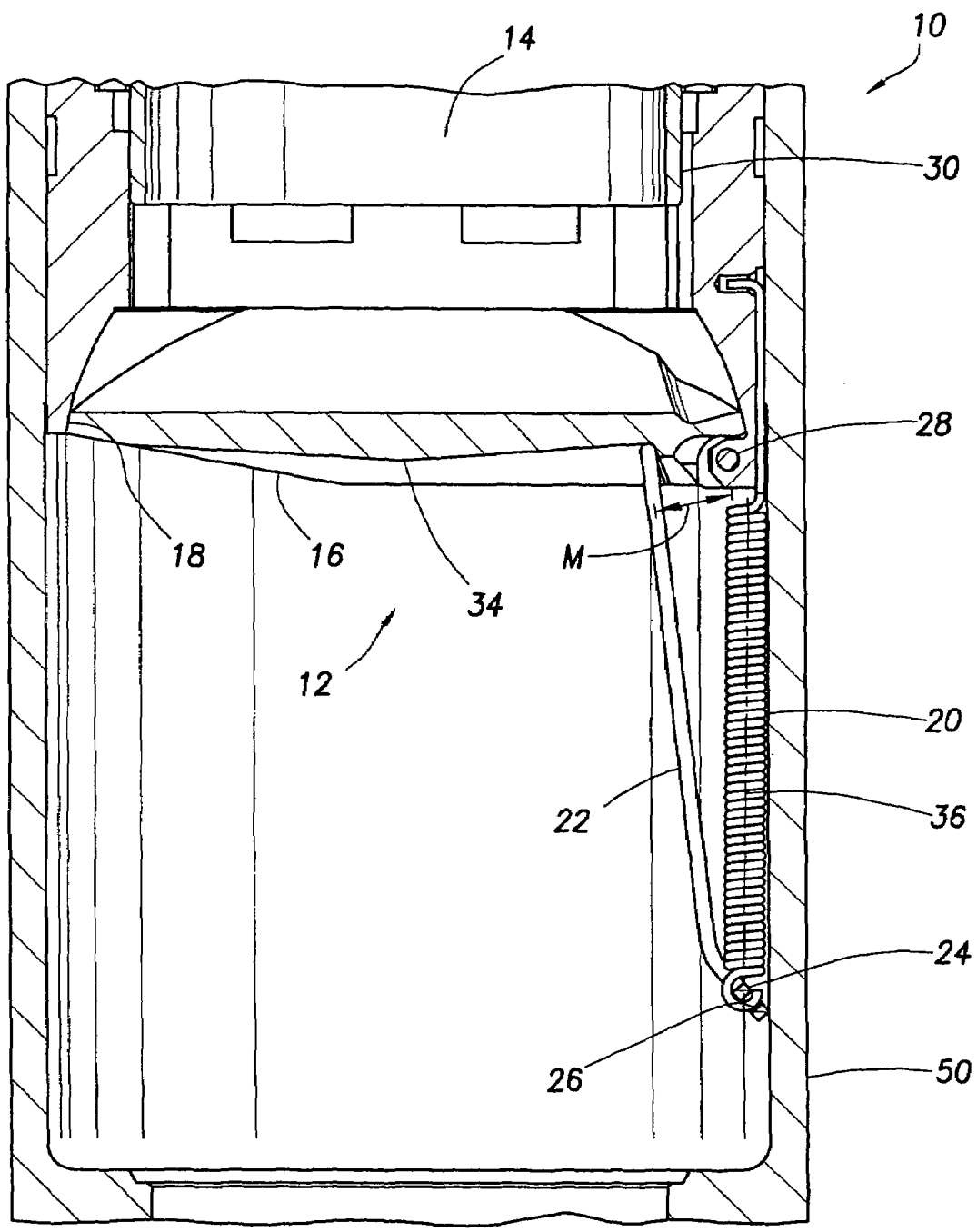
FIG. 1 is a partial cross-sectional view of a first safety valve embodying principles of the present invention, the safety valve being illustrated in a closed configuration.

Representatively illustrated in FIG. 1 is a safety valve 10 which embodies principles of the present invention. In the following description of the safety valve 10 and other apparatus and methods described herein, directional terms, such as "above", "below", "upper", "lower", etc., are used only for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention.

Only a portion of the safety valve 10 is depicted in FIG. 1, since the remainder of the safety valve may be similar to prior safety valves, such as the safety valve described in the incorporated U.S. Pat. No. 6,227,299. It should also be understood that the principles of the present invention may be incorporated into any types of valve, such as ball valves, sliding sleeve valves, etc., and may be incorporated into any type of safety valve.

The safety valve 10 illustrated in FIG. 1 includes a closure mechanism 12 for selectively permitting and preventing flow through a fluid passage 14 formed longitudinally through the valve. The closure mechanism 12 includes a closure member or flapper 16 which sealingly engages a seat 18 to prevent flow through the passage 14.

Figure 2:
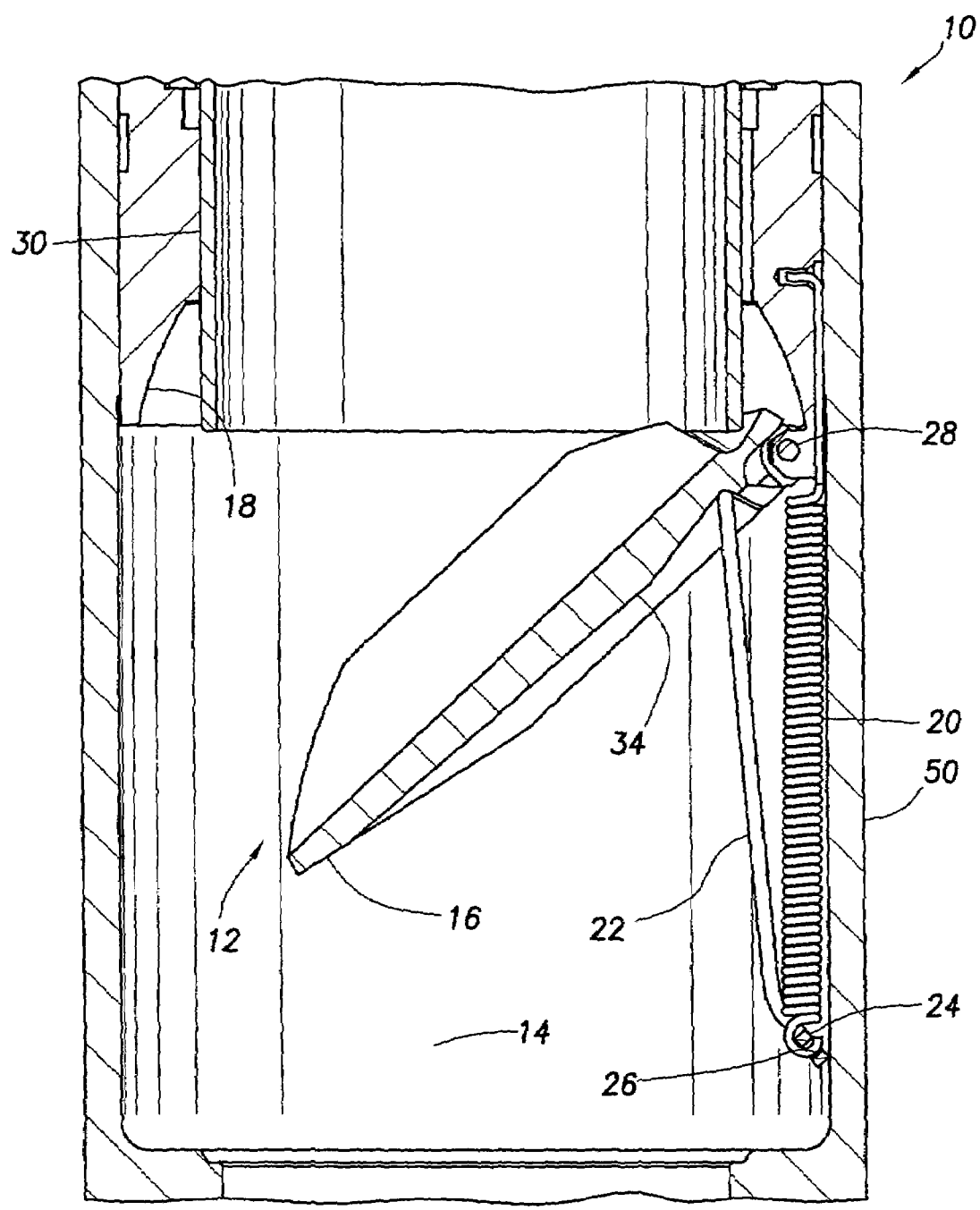
FIG. 2 is a partial cross-sectional view of the first safety valve in an intermediate configuration.
Figure 3:
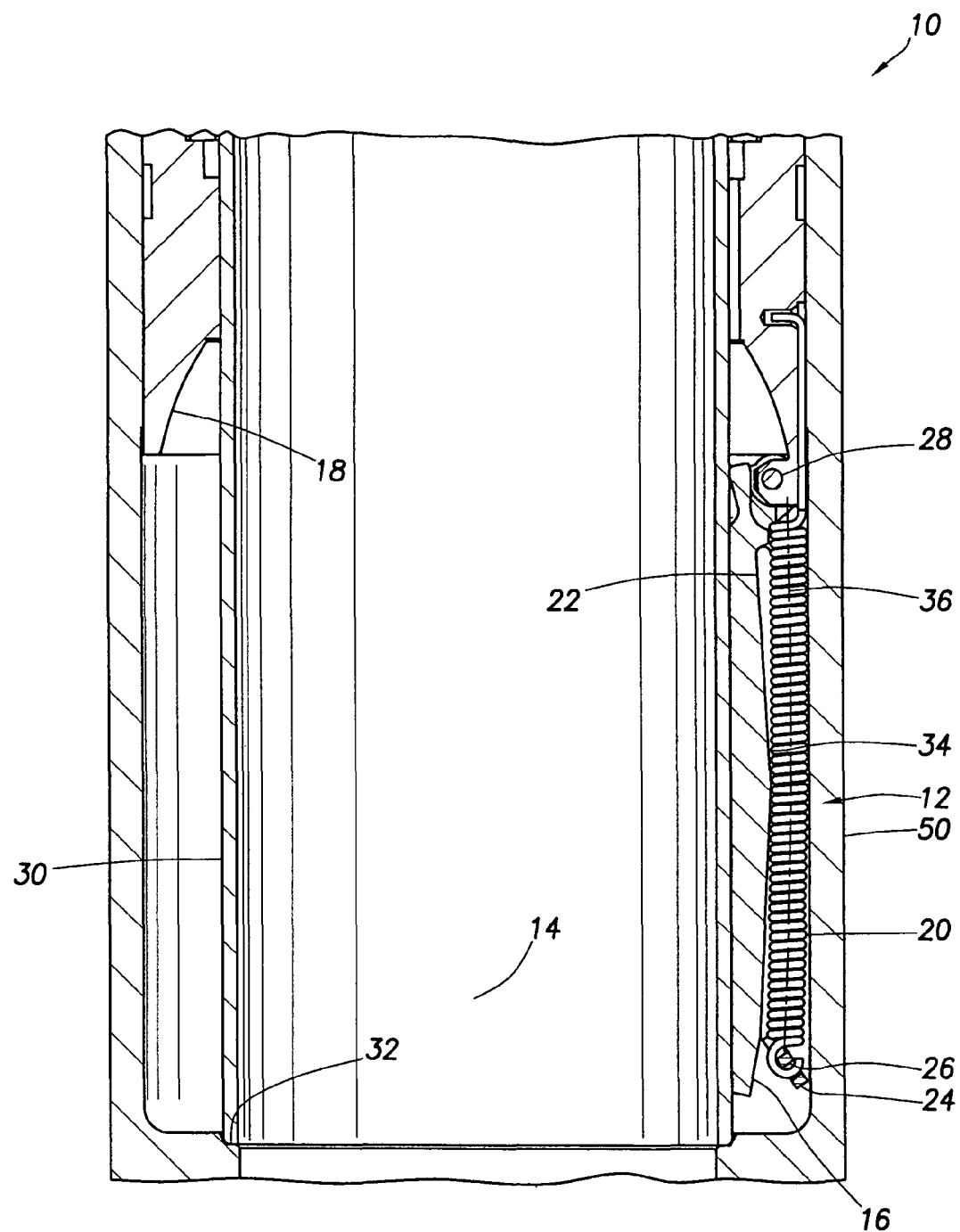
FIG. 3 is a partial cross-sectional view of the first safety valve in an open configuration.

As depicted in FIG. 1, the flapper 16 is in its closed position. In FIG. 2, the flapper 16 is illustrated in an intermediate position, in which somewhat restricted flow is permitted through the passage 14. In FIG. 3, the flapper 16 is illustrated in its open position, in which substantially unrestricted flow is permitted through the passage 14.

A biasing device or extension spring 20 is used to bias the flapper 16 toward its closed position. As used herein, the term "extension spring" indicates a spring which exerts an increased biasing force as its length is increased or extended. Conversely, the biasing force exerted by an extension spring decreases as its length decreases.

The spring 20 is secured at its upper end to the seat 18, and is secured at its lower end to a beam 22. The beam 22 is pivotably connected at its upper end to the flapper 16.

Although only one spring 20 is visible in FIG. 1 connected to one lateral side of the beam 22, there are actually two of the springs connected to an opening 26 in a central portion 24 of the beam between two lateral sides thereof. The laterally adjacent springs 20 exert an upwardly biasing force on the central portion 24 of the beam 22, and the force is transmitted by the beam to the flapper 16 to thereby rotate the flapper toward the seat 18 about a hinge pin or pivot 28. The biasing force exerted by the spring 20 increases as the spring lengthens, and decreases as the spring's length decreases.

Note that, in the closed configuration of the safety valve 10 depicted in FIG. 1. a moment arm M is formed between the beam 22 and the pivot 28 for applying the biasing force from the spring 20 to the flapper 16 to bias it to the closed position. It will be appreciated by those skilled in the art that this moment arm M decreases as the flapper 16 pivots to the intermediate position depicted in FIG. 2, and the moment arm further decreases as the flapper pivots to the open position depicted in FIG. 3. Thus, the moment arm M increases as the flapper 16 pivots toward the closed position.

However, the biasing force applied by the spring 20 to the flapper 16 via the beam 22 decreases as the flapper pivots toward the closed position, because the spring decreases in length. The torque or moment (biasing force X moment arm) applied to the flapper 16 about the pivot 28 may remain substantially constant, or it may actually increase, as the flapper pivots toward the closed position. For example, the increase in the moment arm M length may offset the decrease in the biasing force exerted by the spring 20.

In FIG. 3, an opening prong or flow tube 30 is depicted in a downwardly disposed position for opening the safety valve 10 to permit flow through the passage 14. A lower end of the flow tube 30 contacts an annular shoulder 32 extending about the passage 14. This contact between the flow tube 30 and the shoulder 32 substantially isolates the closure mechanism 12 from debris in the passage 14 and from erosion or other damage due to the flow in the passage.

In FIG. 1, the flow tube 30 is depicted in its upwardly disposed position, permitting the flapper 16 to be pivoted upward by the biasing force exerted by the spring 20. The flow tube 30 may be displaced between its positions by, for example, application of pressure, mechanical force, electrical devices, etc. Of course, if another type of valve is used, such as a ball valve or sliding sleeve valve, a flow tube may not be used at all to operate the valve.

Note that a raised projection 34 formed on the flapper 16 contacts the beam 22 and the spring 20 as the flapper pivots to the open position shown in FIG. 3. After such contact, further pivoting of the flapper 16 toward the open position bends or flexes the beam 22 and the spring 20. That is, the beam 22 is bent to an increasingly curved configuration as the flapper 16 pivots toward the open position, and a longitudinal axis 36 of the spring 20 is increasingly flexed as the flapper pivots toward the open position.

This flexing of the beam 22 and spring 20 applies additional biasing force to the flapper 16 at the projection 34. This additional biasing force is useful to initiate pivoting of the flapper 16 toward its closed position from its open position. The additional biasing force is present as long as the projection 34 contacts and deflects the beam 22 and/or spring 20.

It is contemplated that, even if the spring 20 were to fail, the biasing force produced by flexing the beam 22 could be sufficient to at least initially pivot the flapper 16 toward its closed position from its open position. Once initially pivoted toward its closed position, fluid flow through the passage 14 would act to pivot the flapper 16 completely to its closed position and, once closed, a pressure differential across the flapper would maintain it closed to prevent accidental release of fluids from the well.

By positioning the projection 34 closer to the pivot 28, as depicted in FIG. 2, the projection will contact and deflect the beam 22 and/or spring 20 through a greater proportion of the flapper 16 pivoting displacement. In the alternate configuration illustrated in FIG. 2, the projection 34 contacts the beam 22 and spring 20 closer to the connection between the beam and the flapper 16 than to the connection between the beam and the spring.

Figure 4:
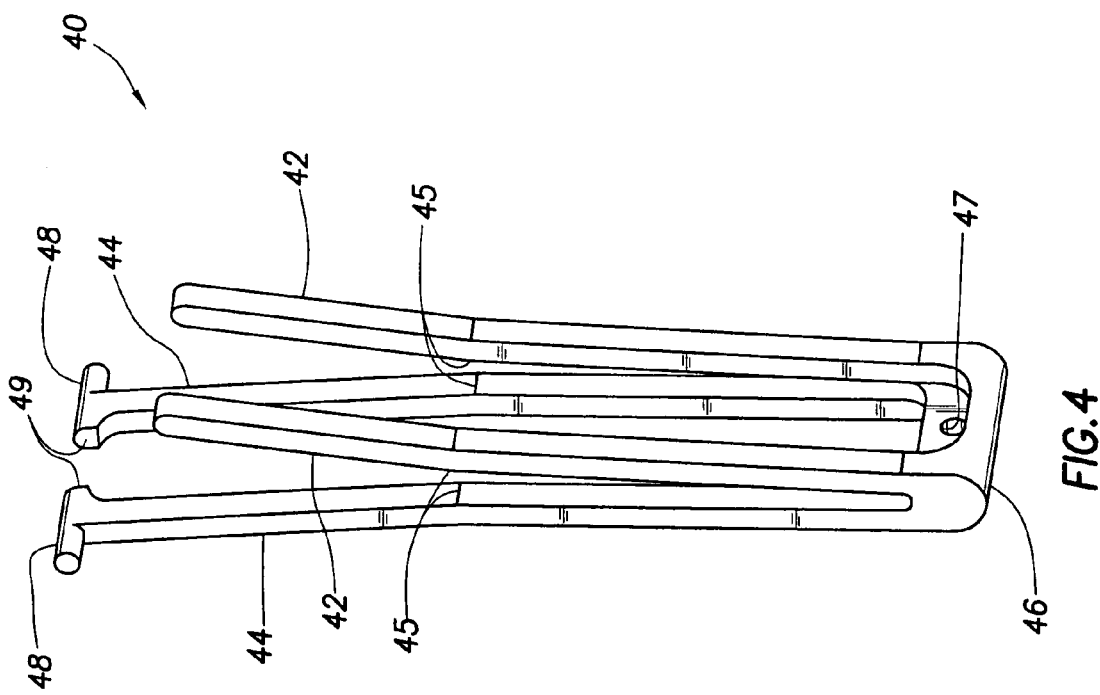
FIG. 4 is an isometric view of a biasing device of a second safety valve embodying principles of the invention.

Referring additionally now to FIG. 4, an alternate beam 40 is representatively illustrated. The beam 40 may be used in place of the beam 22 in the safety valve 10. One significant difference between the beam 40 and the beam 22 is that the beam 40 includes appendages 42 which are bent or flexed as the flapper 16 displaces to its open position, thereby providing additional biasing force for pivoting the flapper to its closed position.

As with the beam 22 described above, the beam 40 includes two lateral sides 44 joined to a central portion 46. When used in the safety valve 10, one or more of the spring(s) 20 is/are attached to the central portion 46 via an opening 47 (similar to the opening 26 described above), and the beam sides 44 are pivotably connected to the flapper 16 using laterally extending pegs 48. Thus, the biasing force exerted by the spring(s) 20 is transmitted from the central portion 46 to the pegs 48 via the beam sides 44, and thence to the flapper 16.

To attach the beam 40 to the flapper 16, the sides 44 are squeezed together to decrease the relative distance between the pegs 48. A pair of stops 49 are formed inwardly of the pegs 48 to limit the inward displacement of the sides 44. This prevents overstressing of sides 44 at the central portion 46.

When the flapper 16 pivots to the open position (as depicted in FIG. 3), the appendages 42 are pressed against a sidewall 50 of the safety valve 10, thereby bending or flexing the appendages. This bending of the appendages 42 causes an additional biasing force to be applied to the flapper 16. The additional biasing force biases the flapper 16 toward the closed position.

Note that the sides 44 and the appendages 42 diverge away from each other at bends or elbows 45. When the flapper 16 is opened, the sides 44 are flexed toward the appendages 42. Eventually, the bends or elbows 45 of the respective sides 44 and appendages 42 will contact each other. This contact limits further flexing of the sides 44 and appendages 42 at the central portion 46, thereby preventing overstressing of the sides and appendages.

Figure 5:
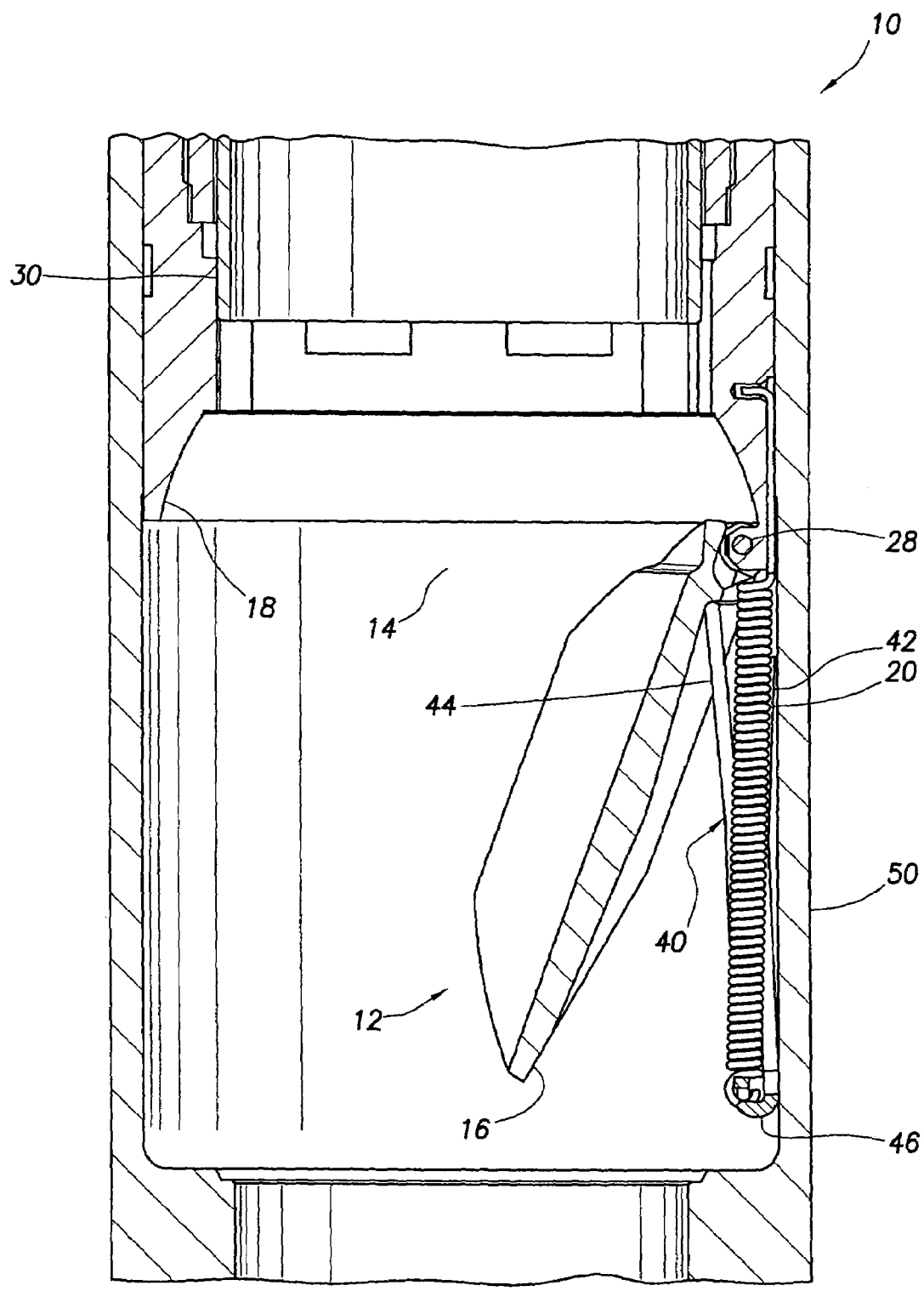
FIG. 5 is a partial cross-sectional view of the second safety valve in an intermediate configuration.
Figure 6:
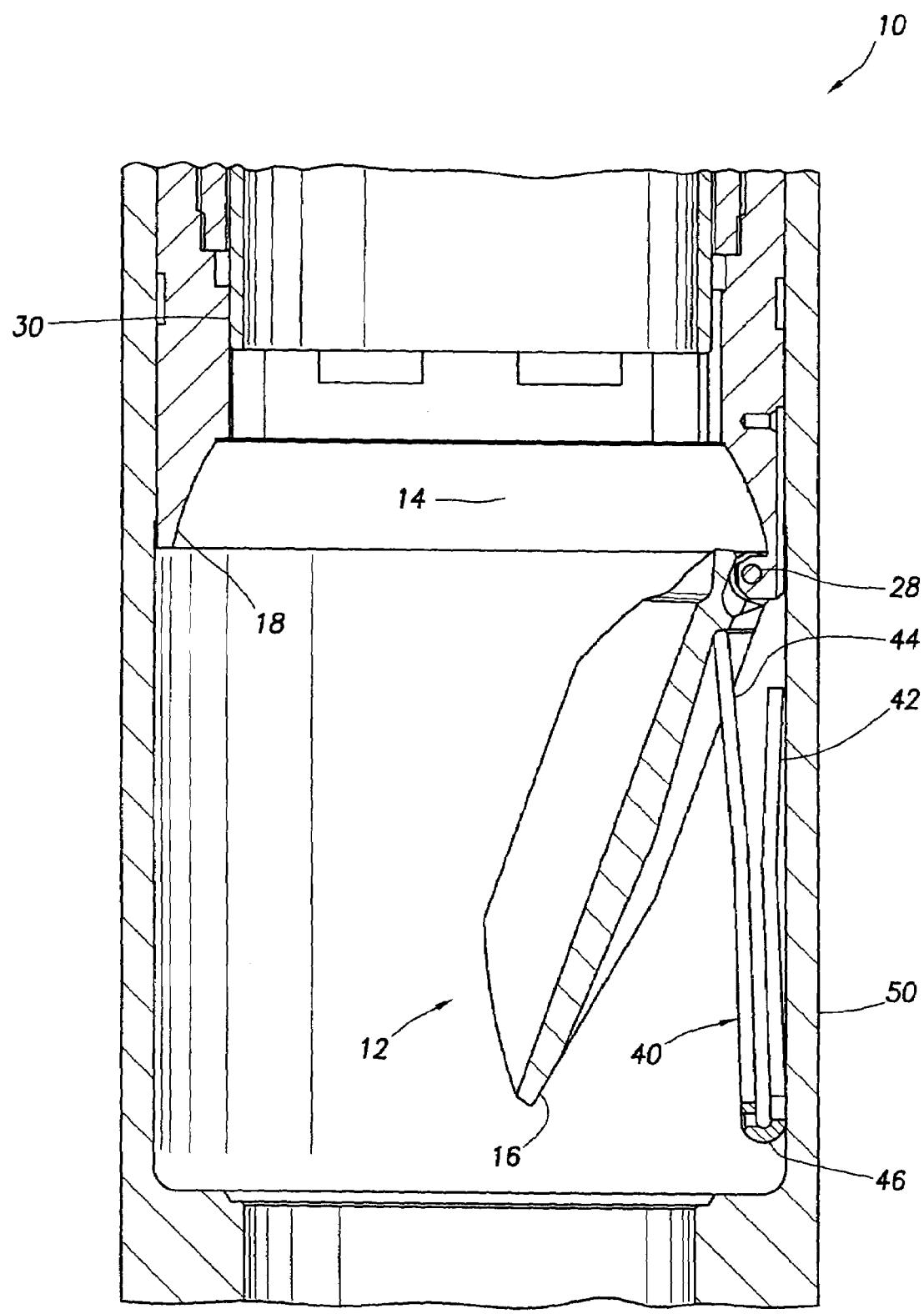
FIG. 6 is a partial cross-sectional view of the second safety valve in the intermediate configuration with an extension spring thereof removed.

The beam 40 is depicted in FIG. 5 installed in the safety valve 10 in place of the beam 22. In this view the relationship between the appendages 42 and the sidewall 50 may be seen. A clearer view is shown in FIG. 6, with the spring 20 removed. From this view it may be appreciated how the appendages 42 are flexed by contact with the sidewall 50 as the flapper 16 pivots toward its open position.

The appendages 42 of the beam 40 extend in a longitudinal direction relative to the sidewall 50 when the beam is used in the safety valve 10. The appendages 42 extend in the same longitudinal direction relative to the central portion 46 as do the sides 44. Thus, the beam 40 may be described as being "folded over" at the central portion 46.

This "folded over" design of the beam 40 provides a biasing force to close the flapper 16 over a substantial portion of its pivoting displacement. It is contemplated that the beam 40 could be used to close the flapper 16, even without use of the separate spring(s) 20.

Figure 7:
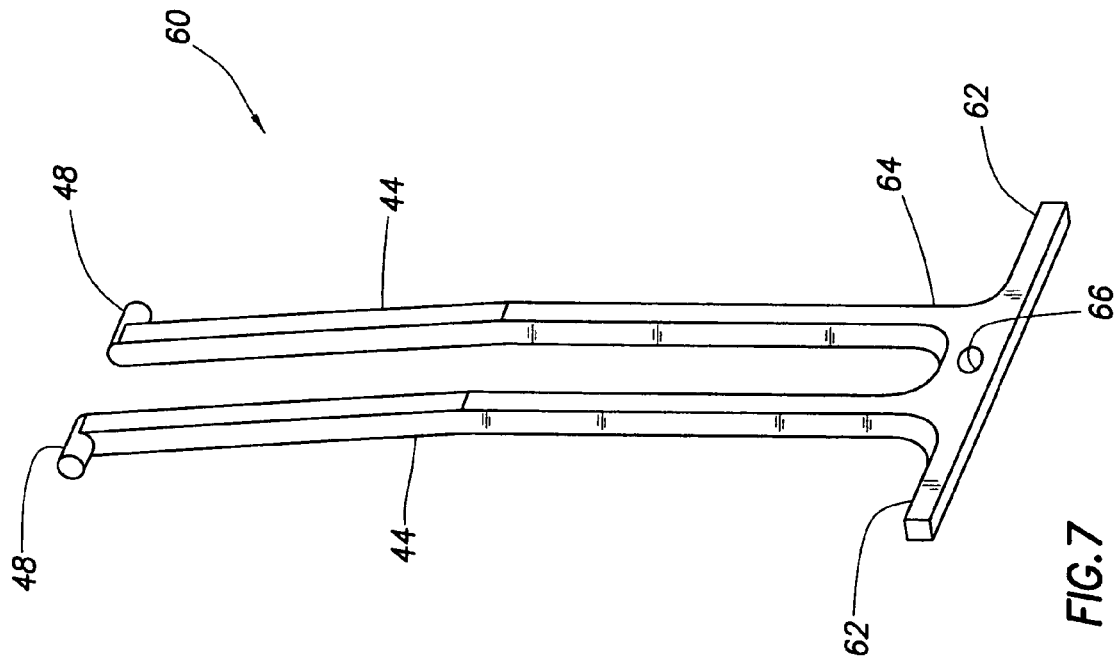
FIG. 7 is an isometric view of another biasing device which may be used in the second safety valve.

Representatively illustrated in FIG. 7 is another alternate beam 60 which includes appendages 62 extending laterally from a central portion 64 having an opening 66 for connecting one or more of the springs 20 thereto. As with the appendages 42 of the beam 40, the appendages 62 will be flexed by contact with the sidewall 50 as the flapper 16 pivots toward its open position. This flexing of the appendages 62 will apply an initial biasing force to the flapper 16 to pivot the flapper toward its closed position.

Figure 8:
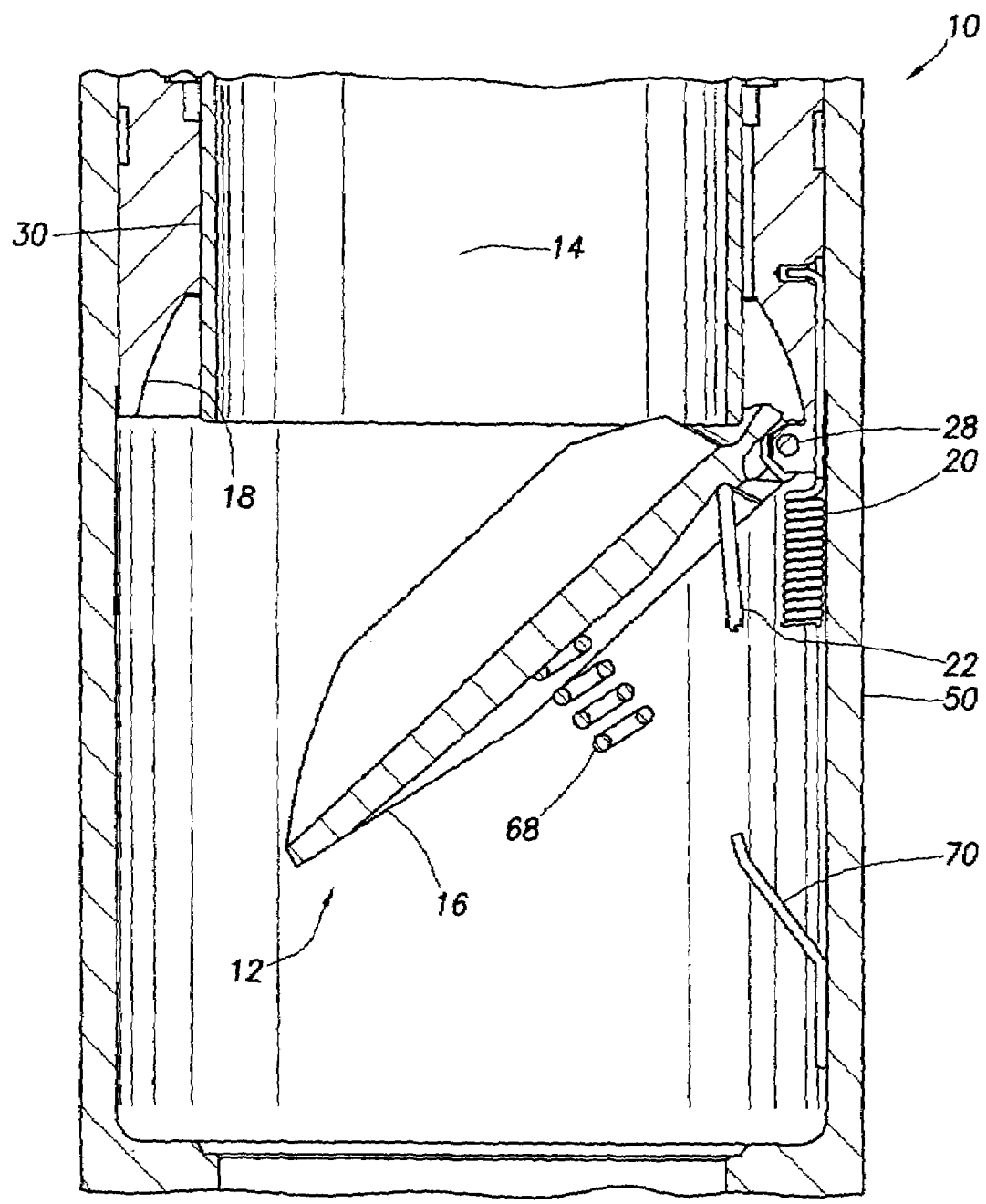
FIG. 8 is a partial cross-sectional view of the first safety valve having additional optional biasing devices installed therein.

Referring additionally now to FIG. 8, the safety valve 10 is representatively illustrated with additional biasing devices 68, 70 installed therein. The biasing device 68 is depicted as a compression spring mounted to an underside of the flapper 16. The biasing device 70 is depicted as a leaf spring or cantilever mounted to an interior of the sidewall 50.

As the flapper 16 pivots to its open position, the spring 68 will eventually contact the sidewall 50. Further pivoting of the flapper 16 will compress the spring 68 between the flapper and the sidewall 50. This compression of the spring 68 will apply a biasing force to the flapper 16, biasing the flapper toward its closed position.

Similarly, as the flapper 16 pivots to its open position, the spring 70 will eventually contact the flapper. Further pivoting of the flapper 16 will flex or bend the spring 70. This flexing of the spring 70 will apply a biasing force to the flapper 16, biasing the flapper toward its closed position.

Thus, it will be readily appreciated by those skilled in the art that the springs 68, 70 and the appendages 42, 62 of the beams 40, 60 provide additional biasing forces for initiating pivoting displacement of the flapper 16 from its open position to its closed position.

Figure 9:
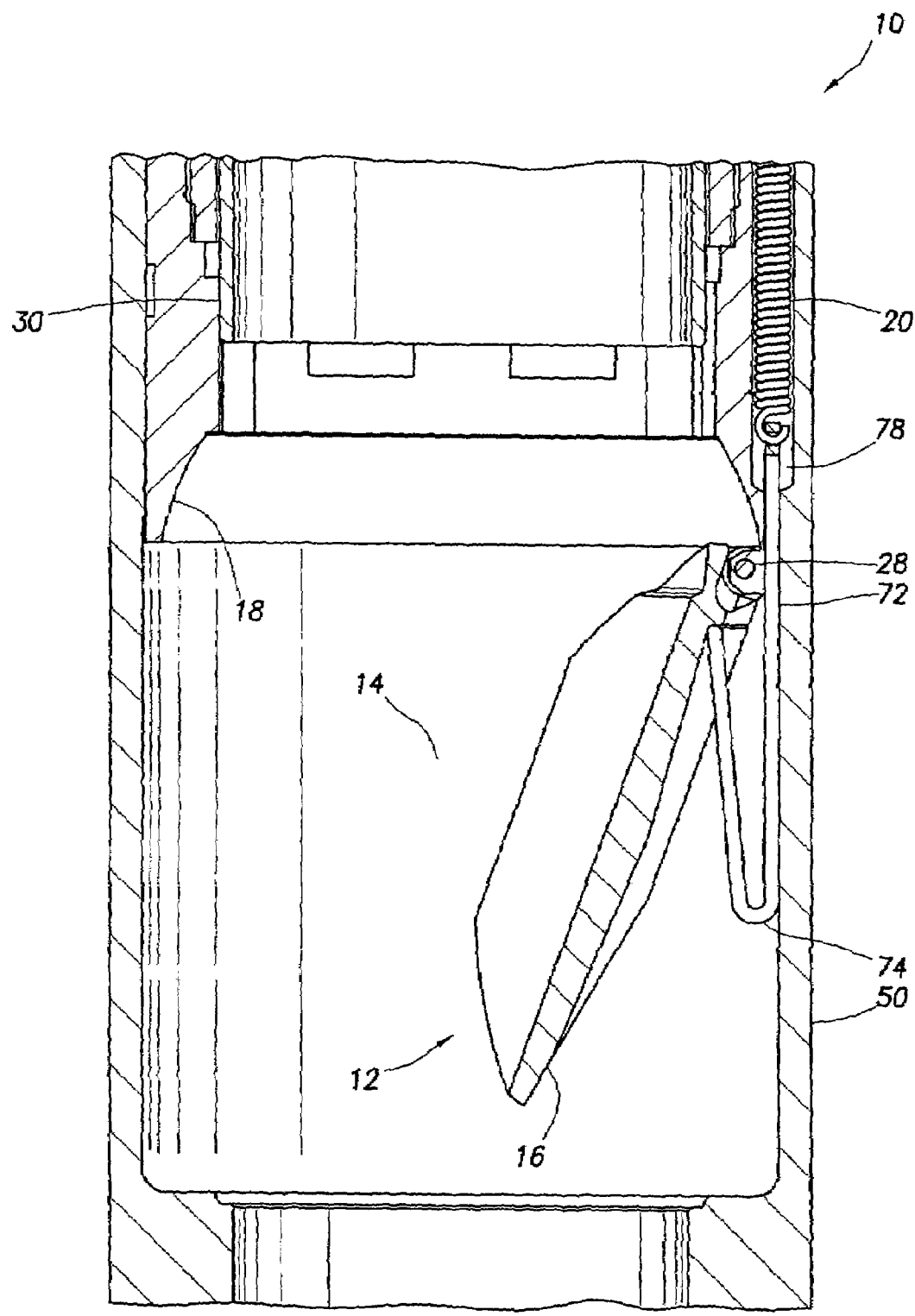
FIG. 9 is a partial cross-sectional view of the first safety valve having an extension spring thereof located in an alternate position.

Representatively illustrated in FIG. 9 is another alternate configuration of the safety valve 10. In this configuration, the spring 20 is positioned above the seat 18 in the valve 10. This positioning of the spring 20 may permit further reduction of the overall length of the safety valve 10, or it may permit an outer diameter of the valve to be reduced, because the spring is not interposed between the flapper 16 and the sidewall 50 in the open configuration of the valve.

A beam 72 is connected to a lower end of the spring 20 and extends downwardly therefrom to a central portion 74. From the central portion 74, the beam 72 extends upwardly to a pivoting connection with the flapper 16. Note that, as the flapper 16 pivots toward its open position, the beam 72 will be increasingly flexed or bent by its lateral compression between the flapper and the sidewall 50, thereby applying an additional biasing force to the flapper, the additional biasing force biasing the flapper toward its closed position.

Figure 10:
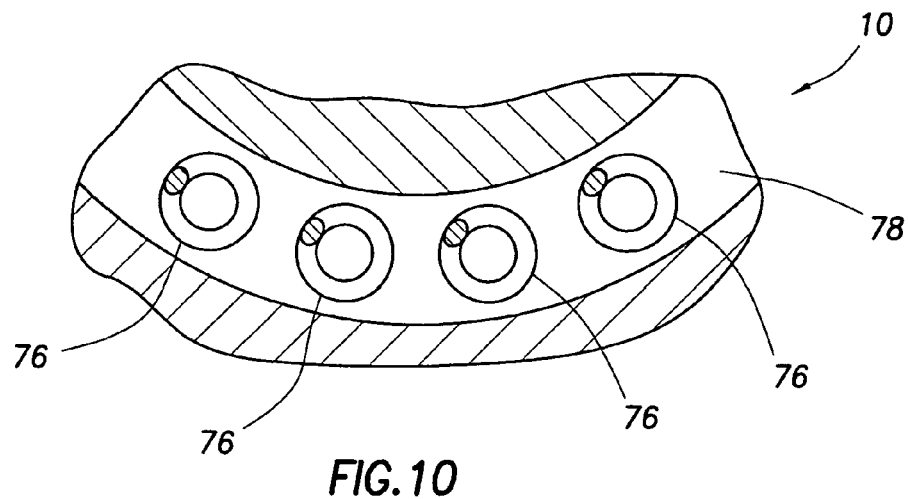
FIG. 10 is a partial cross-sectional view of the first safety valve showing a first alternate arrangement of extension springs thereof.
Figure 11:
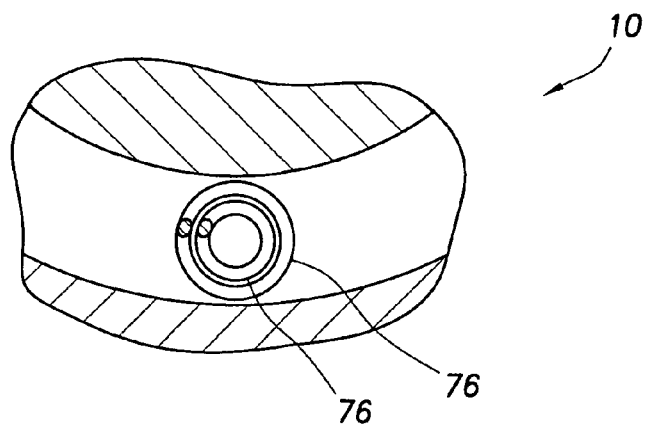
FIG. 11 is a partial cross-sectional view of the first safety valve showing a second alternate arrangement of the extension springs.
Figure 12:
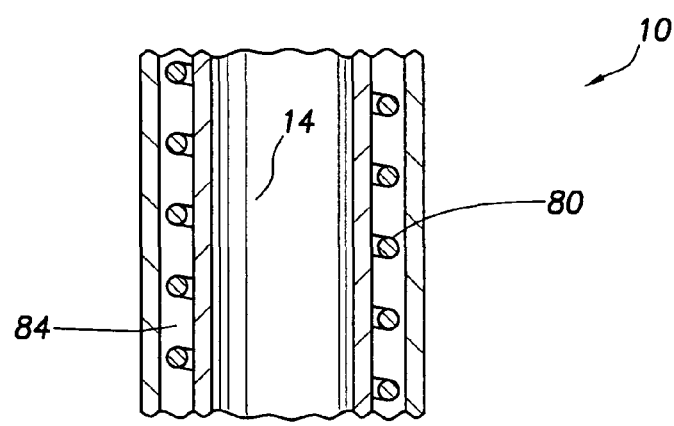
FIG. 12 is a partial cross-sectional view of the first safety valve showing a third alternate arrangement of the extension springs.

Referring additionally now to FIGS. 10–12, alternate positionings of biasing devices in the safety valve 10 are representatively illustrated. In FIG. 10, multiple extension springs 76 are circumferentially spaced apart in an annular, or partially annular, space 78 formed in the safety valve 10. For example, the space 78 could be formed in the safety valve 10 alternate configuration depicted in FIG. 9, in which case the spring 20 shown in FIG. 9 would be one of the springs 76 illustrated in FIG. 10.

Each of the springs 76 would be connected to the beam 72 and would exert an upwardly directed biasing force on the beam. In this manner, an increased total biasing force (due to the increased number of springs 76) may be applied to the beam 72, and the springs may provide redundancy for each other in the event that one or more of the springs should fail. Another advantage may be that smaller springs 76 can be used (since there are more of the springs), thereby permitting the safety valve 10 to have a smaller outer diameter.

In FIG. 11, the springs 76 are arranged with one of the springs inside another of the springs. This arrangement provides the increased biasing force due to the increased number of springs 76, as well as redundancy.

In FIG. 12, a spring 80 is positioned so that it encircles the passage 14 in an annular space 84. This arrangement increases the overall size of the spring 80, thereby permitting a corresponding increase in the biasing force produced, without necessitating an increase in the outer diameter of the safety valve 10. Indeed, the outer diameter of the safety valve 10 may be reduced by using the arrangement of FIG. 12. Redundancy may be provided in this configuration by positioning another one or more additional springs within the spring 80, as illustrated for the springs 76 in FIG. 11.

Figure 13:
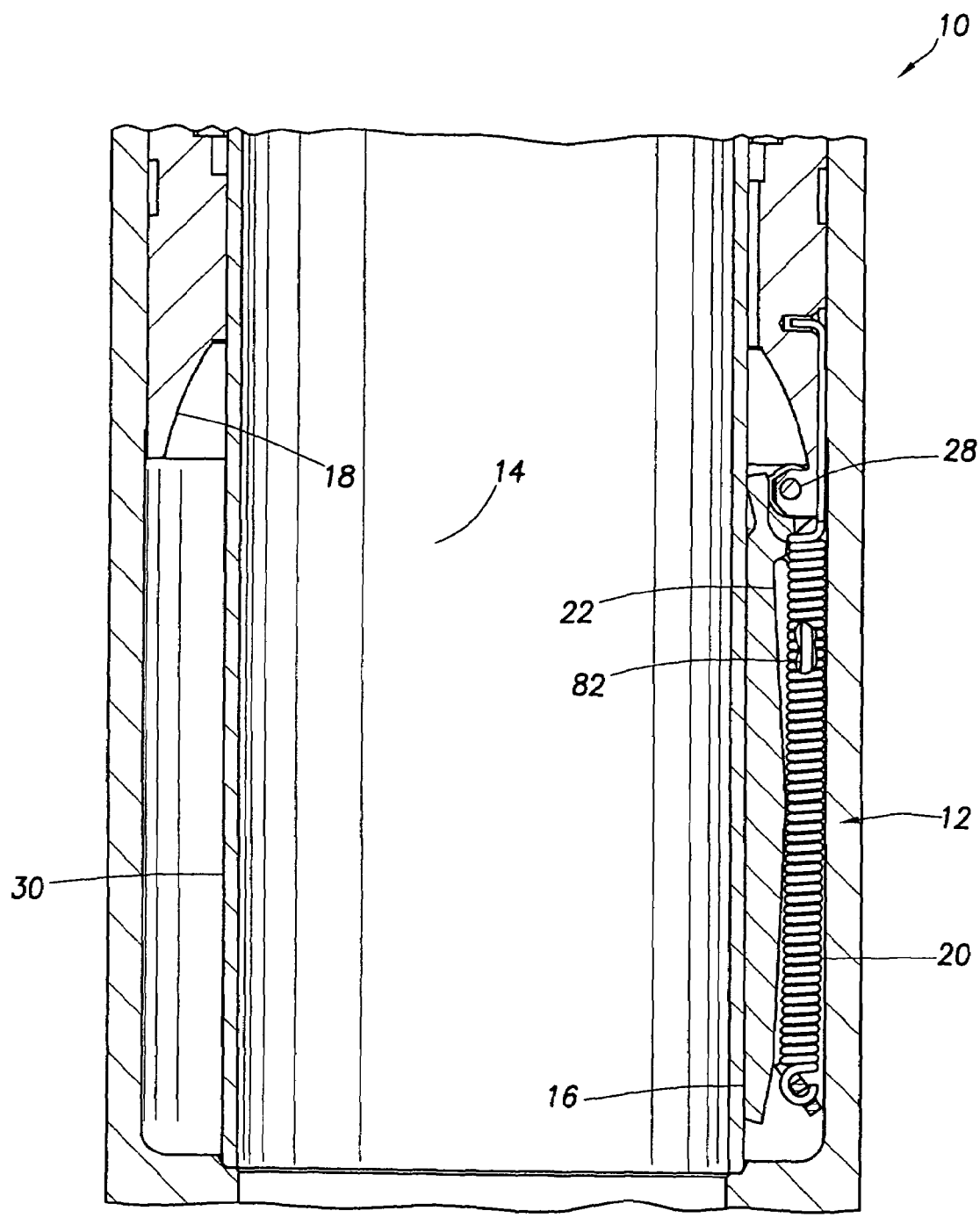
FIG. 13 is a partial cross-sectional view of the first safety valve showing an alternate configuration of the extension springs.

Referring additionally now to FIG. 13, another alternate configuration of the safety valve 10 is representatively illustrated. In this alternate configuration, another beam 82 is positioned longitudinally within the spring 20. This beam 82 is used to apply an additional biasing force to the flapper 16 as it displaces to its open position.

As noted above, the spring 20 is bent or flexed by the flapper 16 when the flapper pivots to its open position. When the alternate configuration of FIG. 13 is used, the beam 82 inside the spring 20 is also flexed as the spring is flexed by the flapper 16. This flexing of the beam 82 applies an additional biasing force to the flapper 16 (the biasing force increasing as the flapper displaces toward the open position), biasing the flapper toward its closed position.

The beam 82 may be straight, or it may be bent or curved when the flapper 16 is in its closed position. When the flapper 16 is pivoted to its open position, the beam 82 may be straightened (if previously bent or curved), the beam may be bent (if initially straight), or further bent (if initially bent or curved).

Of course, a person skilled in the art would, upon a careful consideration of the above description of representative embodiments of the invention, readily appreciate that many modifications, additions, substitutions, deletions, and other changes may be made to these specific embodiments, and such changes are contemplated by the principles of the present invention. Accordingly, the foregoing detailed description is to be clearly understood as being given by way of illustration and example only, the spirit and scope of the present invention being limited solely by the appended claims and their equivalents.

What is claimed is:

1. A valve for use in a subterranean well, the valve comprising:
   a closure member having open and closed positions;
   a biasing device having a length which decreases as the closure member displaces toward the closed position; and
   a beam extending longitudinally within the biasing device, the beam being increasingly flexed, thereby increasingly biasing the closure member toward the closed position, as the closure member displaces toward the open position.

2. The valve according to claim 1, wherein the biasing device is bent along its length, thereby increasingly biasing the closure member toward the closed position, as the closure member displaces toward the open position.

3. The valve according to claim 2, wherein the closure member contacts the biasing device to bend the biasing device, as the closure member displaces toward the open position.

4. The valve according to claim 1, wherein the closure member is a flapper, wherein the biasing device is at least one extension spring, and wherein the extension spring is positioned between the flapper and a sidewall of the valve when the flapper is in the open position.

5. A valve for use in a subterranean well, the valve comprising:
   a closure member having open and closed positions;
   a biasing device having a length which decreases as the closure member displaces toward the closed position; and
   a beam interconnected between the closure member and the biasing device, and wherein the beam is bent to an increasingly curved configuration, thereby increasingly biasing the closure member toward the closed position, as the closure member displaces toward the open position.

6. The valve according to claim 5, wherein the closure member contacts the beam and forces the beam to the increasingly curved configuration, as the closure member displaces toward the open position.

7. The valve according to claim 6, wherein the closure member contacts a position on the beam closer to a connection between the beam and the closure member than to a connection between the beam and the biasing device, as the closure member displaces toward the open position.

8. A valve for use in a subterranean well, the valve comprising:
   a closure member having open and closed positions;
   a biasing device having a length which decreases as the closure member displaces toward the closed position; and
   a beam interconnected between the closure member and the biasing device, and wherein the beam has at least one appendage which is increasingly flexed, thereby increasingly biasing the closure member toward the closed position, as the closure member displaces toward the open position.

9. A safety valve for use in a subterranean well, the safety valve comprising:
   a closure member having open and closed positions;
   at least one extension spring biasing the closure member toward the closed position; and
   a biasing device positioned between the closure member and a sidewall of the safety valve when the closure member is in the open position, the biasing device biasing the closure member toward the closed position.

10. The safety valve according to claim 9, wherein there are multiple extension springs biasing the closure member toward the closed position.

11. The safety valve according to claim 10, wherein the extension springs are arranged laterally adjacent each other in the safety valve.

12. The safety valve according to claim 10, wherein the extension springs are circumferentially spaced apart in the safety valve.

13. The safety valve according to claim 10, wherein each of the extension springs independently biases the closure member toward the closed position, such that the extension springs provide redundancy for each other.

14. The safety valve according to claim 10, wherein each of the extension springs is wound in an opposite direction relative to another of the extension springs.

15. The safety valve according to claim 9, wherein a moment applied to the closure member about a pivot by the extension spring increases as the closure member displaces toward the closed position.

16. The safety valve according to claim 9, wherein a moment applied to the closure member about a pivot by the extension spring remains substantially constant as the closure member displaces toward the closed position.

17. The safety valve according to claim 9, wherein a longitudinal axis of the extension spring is increasingly flexed as the closure member displaces toward the open position.

18. The safety valve according to claim 9, wherein the closure member contacts the extension spring, thereby causing the extension spring to flex longitudinally, as the closure member displaces toward the open position.

19. The safety valve according to claim 9, further comprising a beam connected between the closure member and the extension spring.

20. The safety valve according to claim 9, wherein the biasing device is carried on the closure member.

21. The safety valve according to claim 9, wherein the biasing device is carried on the safety valve sidewall.

22. The safety valve according to claim 9, wherein the closure member is a flapper.

23. A safety valve for use in a subterranean well, the safety valve comprising:
   a closure member having open and closed positions;
   at least one extension spring biasing the closure member toward the closed position; and
   a beam connected between the closure member and the extension spring, and wherein the beam is increasingly bent, thereby increasingly biasing the closure member to the closed position, as the closure member displaces toward the open position.

24. A safety valve for use in a subterranean well, the safety valve comprising:
- a closure member having open and closed positions;
- at least one extension spring biasing the closure member toward the closed position; and
- a beam connected between the closure member and the extension spring, and wherein the beam has at least one appendage, the appendage being increasingly bent, thereby increasingly biasing the closure member to the closed position, as the closure member displaces toward the open position.

25. A safety valve for use in a subterranean well, the safety valve comprising:
- a closure member having open and closed positions;
- at least one extension spring biasing the closure member toward the closed position; and
- a beam connected between the closure member and the extension spring, and wherein the closure member contacts the beam, causing the beam to bend and increasingly biasing the closure member to the closed position, as the closure member displaces toward the open position.

26. The safety valve according to claim 25, wherein the closure member contacts the beam closer to a connection between the beam and the closure member than to a connection between the beam and the extension spring.

27. A safety valve for use in a subterranean well, the safety valve comprising:
- a closure member having open and closed positions;
- at least one extension spring biasing the closure member toward the closed position; and
- a beam positioned longitudinally within the extension spring, the beam being increasingly flexed, thereby increasingly biasing the closure member to the closed position, as the closure member displaces toward the open position.

28. A safety valve for use in a subterranean well, the safety valve comprising:
- a closure member having open and closed positions;
- a first biasing device for biasing the closure member toward the closed position; and
- a first beam interconnected between the first biasing device and the closure member, the first beam being flexed to an increasingly curved configuration, thereby increasingly biasing the closure member toward the closed position, as the closure member displaces toward the open position.

29. The safety valve according to claim 28, wherein the first beam has at least one appendage, the appendage being increasingly flexed, thereby increasingly biasing the closure member toward the closed position, as the closure member displaces toward the open position.

30. The safety valve according to claim 28, wherein the first biasing device lengthens, thereby increasingly biasing the closure member toward the closed position, as the closure member displaces toward the open position.

31. The safety valve according to claim 28, wherein a moment applied to the closure member about a pivot by the first biasing device increases as the closure member displaces toward the closed position.

32. The safety valve according to claim 28, wherein a moment applied to the closure member about a pivot by the first biasing device remains substantially constant as the closure member displaces toward the closed position.

33. The safety valve according to claim 28, wherein a longitudinal axis of the first biasing device is increasingly flexed as the closure member displaces toward the open position.

34. The safety valve according to claim 28, wherein the closure member contacts the first biasing device, thereby causing the first biasing device to flex longitudinally, as the closure member displaces toward the open position.

35. The safety valve according to claim 28, further comprising a second beam positioned within the first biasing device, the second beam being increasingly flexed, thereby increasingly biasing the closure member to the closed position, as the closure member displaces toward the open position.

36. The safety valve according to claim 28, further comprising a second biasing device positioned between the closure member and a sidewall of the safety valve when the closure member is in the open position, the second biasing device biasing the closure member toward the closed position.

37. The safety valve according to claim 36, wherein the second biasing device is carried on the closure member.

38. The safety valve according to claim 36, wherein the second biasing device is carried on the safety valve sidewall.

39. The safety valve according to claim 28, wherein the first biasing device is an extension spring.

40. The safety valve according to claim 28, wherein the closure member is a flapper.

41. A safety valve for use in a subterranean well, the safety valve comprising:
- a closure member having open and closed positions;
- a first biasing device for biasing the closure member toward the closed position, the first biasing device being flexed to an increasingly curved configuration, thereby increasingly biasing the closure member toward the closed position, as the closure member displaces toward the open position; and
- a second biasing device positioned between the closure member and a sidewall of the safety valve when the closure member is in the open position, the second biasing device biasing the closure member toward the closed position.

42. The safety valve according to claim 41, wherein the closure member contacts the first biasing device to flex the first biasing device as the closure member displaces toward the open position.

43. The safety valve according to claim 41, wherein the first biasing device lengthens, thereby increasingly biasing the closure member toward the closed position, as the closure member displaces toward the open position.

44. The safety valve according to claim 41, wherein a moment applied to the closure member about a pivot by the first biasing device increases as the closure member displaces toward the closed position.

45. The safety valve according to claim 41, wherein a moment applied to the closure member about a pivot by the first biasing device remains substantially constant as the closure member displaces toward the closed position.

46. The safety valve according to claim 41, wherein the second biasing device is carried on the closure member.

47. The safety valve according to claim 41, wherein the second biasing device is carried on the safety valve sidewall.

48. The safety valve according to claim 41, wherein the first biasing device is an extension spring.

49. A safety valve for use in a subterranean well, the safety valve comprising:
- a closure member having open and closed positions;

a biasing device for biasing the closure member toward the closed position, the biasing device being flexed to an increasingly curved configuration, thereby increasingly biasing the closure member toward the closed position, as the closure member displaces toward the open position; and a beam interconnected between the biasing device and the closure member, the beam being flexed to an increasingly curved configuration, thereby increasingly biasing the closure member toward the closed position, as the closure member displaces toward the open position.

50. The safety valve according to claim 49, wherein the beam has at least one appendage, the appendage being increasingly flexed, thereby increasingly biasing the closure member toward the closed position, as the closure member displaces toward the open position.

51. A safety valve for use in a subterranean well, the safety valve comprising:

a closure member having open and closed positions;

a biasing device for biasing the closure member toward the closed position, the biasing device being flexed to an increasingly curved configuration, thereby increasingly biasing the closure member toward the closed position, as the closure member displaces toward the open position; and a beam positioned within the biasing device, the beam being increasingly flexed, thereby increasingly biasing the closure member to the closed position, as the closure member displaces toward the open position.

52. A safety valve for use in a subterranean well, the safety valve comprising:

a closure member having open and closed positions, the closure member being a flapper; and a biasing device for biasing the closure member toward the closed position, the biasing device being flexed to an increasingly curved configuration, thereby increasingly biasing the closure member toward the closed position, as the closure member displaces toward the open position.

53. A safety valve for use in a subterranean well, the safety valve comprising:

a closure member having open and closed positions;

a first biasing device for biasing the closure member toward the closed position, the first biasing device being flexed to an increasingly curved configuration, thereby increasingly biasing the closure member toward the closed position, as the closure member displaces toward the open position; and a second biasing device positioned within the first biasing device.

54. The safety valve according to claim 53, wherein the second biasing device is flexed to an increasingly curved configuration, thereby increasingly biasing the closure member toward the closed position, as the closure member displaces toward the open position.

55. A safety valve for use in a subterranean well, the safety valve comprising:

a closure member having open and closed positions; and a biasing device for biasing the closure member toward the closed position, the biasing device including a beam having at least one side and at least one appendage extending in a same longitudinal direction from a central portion, the beam being compressed laterally when the closure member displaces toward the open position.

56. The safety valve according to claim 55, wherein the side and the appendage are flexed toward each other when the closure member displaces toward the open position.

57. The safety valve according to claim 55, wherein the side has opposite ends, one of the opposite ends being attached to the closure member, and the other opposite end being attached to the central portion.

58. The safety valve according to claim 57, wherein the side is pivotably attached to the closure member.

59. The safety valve according to claim 55, wherein the side and the appendage are compressed between the closure member and a sidewall of a housing of the safety valve when the closure member displaces to its closed position.

60. The safety valve according to claim 55, wherein there are two of the sides laterally adjacent each other, each of the sides having a laterally outwardly extending peg for attachment to the closure member, and wherein each side further has a laterally inwardly extending stop formed thereon for limiting laterally inward displacement of the sides toward each other.

61. The safety valve according to claim 55, wherein each of the side and the appendage has a bend formed thereon, so that the side and appendage diverge from each other in the longitudinal direction.

62. The safety valve according to claim 61, wherein the bends in the side and appendage contact each other during displacement of the closure member to the open position, thereby limiting displacement of the side and appendage toward each other at the central portion.

63. The safety valve according to claim 55, further comprising a spring attached to the biasing device, the spring lengthening as the closure member displaces toward its open position.

64. The safety valve according to claim 63, wherein the spring is attached to the central portion.

65. The safety valve according to claim 63, wherein the spring applies a biasing force to the closure member through the biasing device.

* * * * *